United States Patent [19]

Ehrlinger et al.

[11] Patent Number: 4,671,377
[45] Date of Patent: Jun. 9, 1987

[54] ALL-WHEEL DRIVE FOR A VEHICLE

[75] Inventors: Friedrich Ehrlinger, Friedrichshafen; Hubert Sailer, Markdorf, both of Fed. Rep. of Germany

[73] Assignee: Zahnradfabrik Friedrichshafen AG, Friedrichshafen, Fed. Rep. of Germany

[21] Appl. No.: 823,488

[22] PCT Filed: Apr. 20, 1985

[86] PCT No.: PCT/EP85/00181
§ 371 Date: Jan. 8, 1986
§ 102(e) Date: Jan. 8, 1986

[87] PCT Pub. No.: WO85/05080
PCT Pub. Date: Nov. 21, 1985

[30] Foreign Application Priority Data

May 8, 1984 [WO] PCT Int'l Appl. ............. PCT/EP84/00137

[51] Int. Cl.⁴ .......................... B60K 17/34; F16H 1/44
[52] U.S. Cl. .................................. 180/249; 180/248; 74/710.5; 192/103 F
[58] Field of Search ............... 180/250, 249, 248; 74/710.5; 192/104 F, 104 F

[56] References Cited

U.S. PATENT DOCUMENTS

| 1,704,861 | 3/1929 | Lewis . | |
|---|---|---|---|
| 3,217,847 | 11/1965 | Petrak . | |
| 3,627,072 | 12/1971 | Smirl | 180/249 |
| 3,656,598 | 4/1972 | Goble . | |
| 3,827,520 | 8/1974 | Mueller . | |
| 3,894,446 | 7/1975 | Snoy et al. | 180/250 |
| 4,192,411 | 3/1980 | Fogelberg . | |
| 4,304,317 | 12/1981 | Vanzant et al. | 180/250 |
| 4,462,271 | 7/1984 | Stieg | 180/250 |

FOREIGN PATENT DOCUMENTS

| 2332997 | 7/1972 | Fed. Rep. of Germany . |
| 3223076 | 11/1981 | Fed. Rep. of Germany . |
| PCT/US820-0832 | 1/1984 | PCT Int'l Appl. . |

Primary Examiner—John J. Love
Assistant Examiner—Donn McGiehan
Attorney, Agent, or Firm—Hayes, Davis & Soloway

[57] ABSTRACT

In all-wheel drives having a clutch (12) automatically form-locking upon speed or torque uniformity, the driver can keep them engaged or disengaged as desired, for instance, during the actuation of the service brake (13) or during special uses, or when moving in reverse, and thereby automatic disengagement is prevented and the action of the motor brake over all wheels (10,11) can concomitantly be ensured. The adjusting device (14) used therefor can be directly designed as a shaft brake and directly assembled with the clutch (12) so that a twofold use is achieved and the brake (13) of the vehicle is protected (FIG. 1).

9 Claims, 3 Drawing Figures

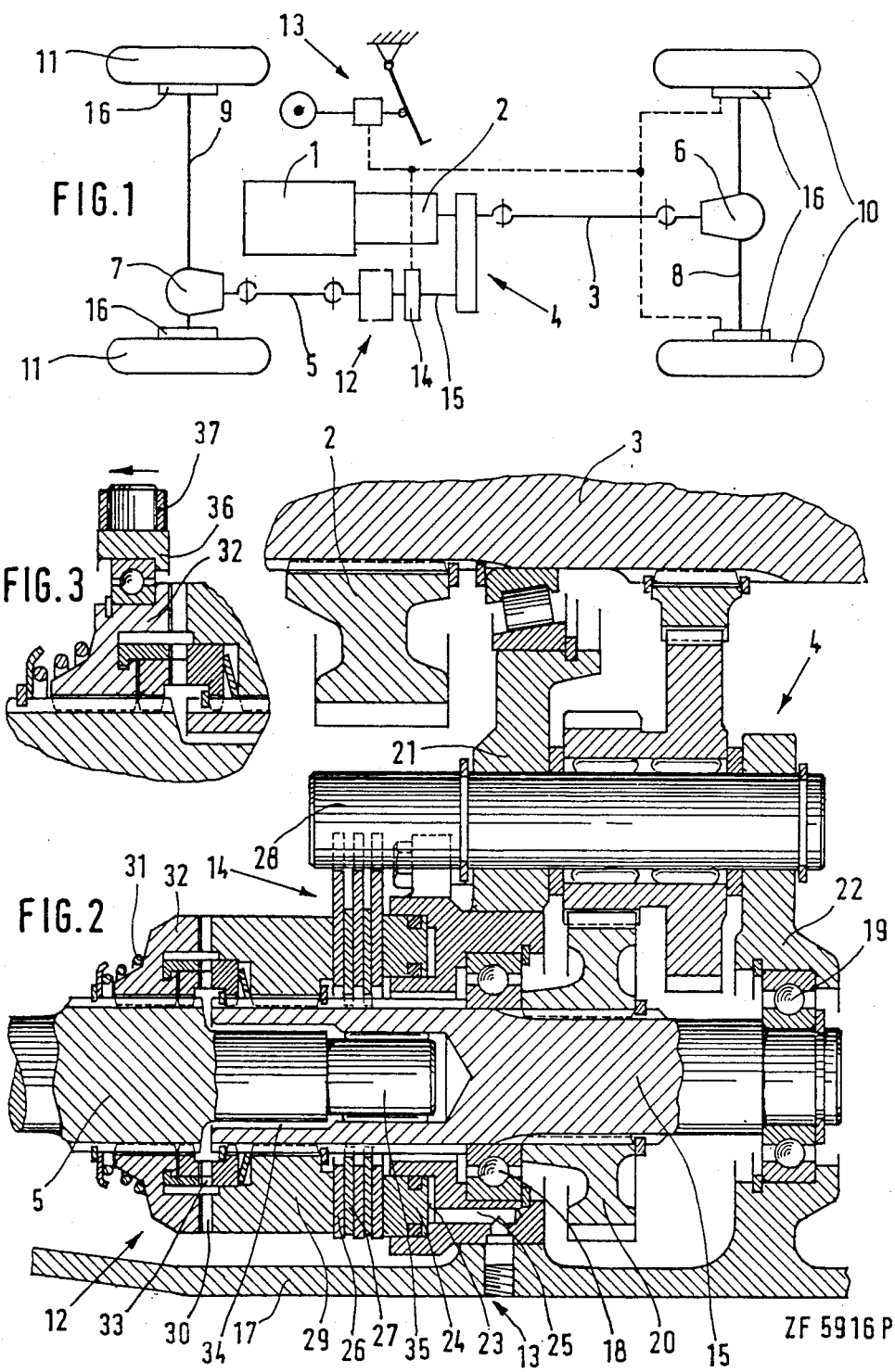

ALL-WHEEL DRIVE FOR A VEHICLE

The invention concerns an all-wheel drive specially meant for heavy agricultural vehicles, tractors and building machines, in which at least 2 axles can be driven by a central driving motor and an automatic form-locking clutch for driving connection of parallel transverse differentials when necessary of a type known per se effects the connection between a secondary output rod and the respective axles or wheels whenever speed or torque differences occur. See U.S. Pat. No. 3,656,598 (column 1, lines 1–39). Conventional longitudinal differentials of said kind and arrangement (for instance, German published application Nos. 32 23 076 "System Nospin" or 23 32 997 "System Torsen") have the disadvantage that driving conditions may occur, for instance, when descending, which cause the longitudinal differential to interrupt takeup of the corresponding axle, due to a speed or torque difference that throws the frictional or form-locking connection out of gear at precisely the time when for reasons of security in traveling or guiding a greater importance is to be attached to retaining the all-wheel drive. In such cases undesired accelerations and overloading or failure of the brakes can also occur. Automatic operation can be an obstacle in the frequent changes of direction and forward and reverse motions often desired in certain building machines. Although it has been sought to overcome said disadvantage by using sensor-controlled clutches (for instance, DE-C No. 30 40 120), these are not suited for form-locking clutches, being inexpensive to make and complicated to fine-tune to the respective types of vehicles and conditions of the intended use so that practical results are still unsatisfactory. Situations (for instance, plowing) where automatic operation of the clutch is not needed at all and where it can wear out quickly can also occur. Although manual contact means for connecting and disconnecting the automatic clutch as needed has been disclosed in U.S. Pat. No. 3,656,598 and U.S. Pat. No. 4,192,411, their optimal use for traveling conditions is not always ensured;

The problem to be solved by the invention is to propose for all-wheel drives of the above mentioned kind longitudinal differential mechanisms which even though changing gear entirely automatically and having a clutch that is in itself automatic can nevertheless be reliably prevented from automatically opening or closing during certain travel conditions (such as descending, plowing, reverse motion and the like) without speed meters, special adjusting devices, etc. The solution to this problem consists in coordinating an adjusting device and a service brake with the automatic clutch of a type known per se whereby the clutch can be opened or kept open and/or prevented from opening or be closed, even when speed or torque uniformity is to be expected on the clutch but differences in speed could still occur, for instance, during a speed increase on the takeup side (such as when descending). Thus, a locking or switching of the clutch is provided which is automatic in normal operation but which the driver can freely manipulate as needed for a shorter or longer period, which is workable without the expense, for instance, of electronic speed comparators and corresponding computers, which functions in forward and reverse effective form-locking, and which ensures braking action over all wheels. According to the invention, the operative connection between the adjusting device and the automatic clutch provides a possibility of individual regulation or activation in a simple way which works with practically no delay and with no additional control system. With no additional monitoring expense whatsoever it is possible to prevent a reduction of the action of the motor brake (such as caused by an eventual undesired disengagement of the takeup rod in question during critical traveling conditions) by adding a simple adjusting device that the driver can activate as needed. Automatic operation is maintained during normal functioning so that, for instance, the tilling when plowing requires no extra manipulation. When the added adjusting device is collapsibly designed with the service brake of the vehicle, activation of equipment (the brake), which is required as a basic component for any vehicle anyway, can simultaneously take on a double function. What matters here is not indispensably the design principle of the clutch, but a free-running locking mechanism responsive to speed differences such as has been known, for instance, in the above cited prior art. An adjusting device activated against the automatically acting clutch counterpart can be locked (for instance, during road travel) against any undesired engagement of the all-wheel drive, thus preventing wear and tear on the tires, for instance. On the other hand, when used in field work the automatic operation facilitates tilling.

Advantageous embodiments of the invention are described in the sub-claims:

The combination of the locking mechanism with the actuation of reverse motion or restoring motions constitutes an especially effective safeguard against faulty connections.

By operatively providing the adjusting device on a shaft brake, the speed difference can be artificially maintained, and at the same time, making a double use of the brake as an adjusting device.

By using the axial lift of the brake-actuating element to actuate the connecting device of the clutch its switch elements can be simplified or reduced in dimensions.

By designing and arranging the shaft brake to be the only brake in the takeup rod disconnectable by the longitudinal differential, additional wheel head brakes can be eliminated; in addition, the danger of a brake being damaged in the wheel area is reduced or free building space is gained for possible deflection or steering motions.

By placing the clutch and the coordinated shaft brake within a common housing (such as the connecting or intermediate axle gear housing), it is possible to design the shaft brake as a low wear and tear laminated brake which moves in oil of relatively small diameter and minimal wear and tear and also to control the oil budget of the clutch centrally with the gear. The advantages of ground clearance and protection against damage in field use are hereby obtained.

By using the guides at the end of the drive shaft that enters in the clutch for both the connecting body at the side of the brake and the inner brake discs of the shaft brake a structure especially favorable for manufacture and assembly results.

By supporting the end of the takeup shaft at the side of the brake in a hollow section of the driving or intermediate shaft, a more simplified and shortened shaft support can be achieved.

Placing the intermediate shaft in an accessory drive and using at the same time its output shaft support not only eliminates static redundances and great overall lengths but leads to a more favorable distribution of bearing forces.

In order to prevent the possibility of the clutch being connected and disconnected in the main range of use too often, the second takeup shaft can be operated with clear forward stroke. The shaft brake can serve solely as service brake or also as locking brake.

The invention is explained in detail with reference to the drawings of an embodiment enumerated herebelow:

FIG. 1 shows an arrangement diagram with the clutch in the drive train for the front axle of a tractor.

FIG. 2 shows a suggested assembly suitable for having the clutch and shaft brake inserted as adjusting device in the same gear housing.

FIG. 3 shows a variant adjusting device without direct combination with a brake whereby the clutch is kept constantly open—that is, all-wheel operation can be eliminated (for instance, for road travel).

In FIG. 1 an auxiliary gear 4 for a second output shaft 5 is situated on the motor 1 via a main takeup shaft 3 driven by a variable gear 2. Each output shaft 3, 5 drives one of the axles 8, 9 and therewith the wheels 10, 11 of the vehicle via transverse differentials 6, 7. The second output shaft 5 has a clutch 12 automatically responsive to speed or torque differences. When differences of speed occur (for instance, during tilling), said clutch 12 automatically couples the front output shaft 5 to the motor 1 or gear 2 so as to be more easily veered with less frictional loss and tire abrasion. If the vehicle rolls on difficult ground or if speed uniformity results (for instance, due to slopes), as consequence of the front wheel axle 9 moving slower, normally the clutch 12 would automatically re-engage so that the second output shaft 5 would then be reactivated without this requiring any manipulation or external impulse.

However, when descending or in field uses, etc. it becomes possible for the second output shaft 5 to be driven by the front wheels 11 more quickly than by the braking motor 1 or the gear 2. A danger then exists that the clutch 2—because of its action principle dependent on speed or torque differences—may automatically disengage and thus the front wheels 11 may lose the braking action of gear 2 and motor 1 at precisely the time when it would be most urgently needed for maintaining steady travel conditions and for protecting the brake. These consequences are now prevented by coordination according to the invention of an adjusting device 14, for example, with the service brake system 13 which the driver can throw into gear for locking the automatic active function of the clutch 12. The latter is preferably mounted on an intermediate shaft 15 which connects the intermediate gear 4 with the transverse differential 7 of the second output shaft 5. If the service brake 13 is already acting to a certain extent as the adjusting device 14 (for instance, when a shaft brake is provided), it will also be activated by the driver at the most favorable moment anyway when the speed of the vehicle increases; thus, any undesired disengagement of the clutch 12 will be prevented until braking is no longer needed. Since a minor stress on all friction service brakes will also be obtained in this manner, brakes can ultimately be made smaller than normally required; or wheel hub brakes 16 on the front wheels 11 can be eliminated altogether. If a shaft brake is directly used as adjusting device 14, the added advantage that absolutely no separate adjusting device has to be used directly for the clutch 12 results. It is thereby actually possible to ensure in a manner that has a double application, starting from the output side, that uniformity and therewith an automatic opening of the clutch will be maintained or obtained, and that it will be limited precisely to the moment of need without additional controls. The same effect logically occurs as well when the connecting device of the clutch 12 is directly loaded by means of an axially displaceable brake-actuating device (for instance, by a supporting plate of the shaft brake). Depending on requirements for whatever the intended use, the adjusting device 14 can be switched in for only short periods of use or permanently by providing corresponding elements switchable by hand (such as a control button on the board).

In FIG. 2 the clutch 12 is combined with the adjusting device 14, which has been here designed as a laminated shaft brake, a form a structural group surrounded by a common housing 17. The frictional connection starts from the main drive shaft 3—which here is also the first output shaft—and passes via the intermediate gear 4, here designed to shift somewhat in speed in order to obtain a forward motion of the front wheels 11, to the intermediate shaft 15 which is normally operatively connected via the clutch 12 to the second output shaft 5. The bearings 18, 19 of the intermediate shaft 15, which also carries the takeup wheel 20 of the intermediate gear 4, are situated on the bars 21, 22 of the housing 17. On the bar 21 at the gear side there is a flanged rotary cylinder 23 for fluid that surrounds the intermediate shaft 15 and in which a rotary piston 24 can be brought to abut by means of bores 25 for inducible pressure pulses from the operating brake unit 13 of the vehicle toward external and internal friction laminae 26, 27 of the adjusting device 14 designed as shaft brake. The pressing force produced thereby, according to the drawing, acts further, via laminae 26, 27 which are on one side in the intermediate shaft 15 and on the other abut without twist on a housing of solid external laminae holder 28, against an axially displaceable brake body 29 which for its part abuts on a switch device 30 of the clutch 12 or itself forms said device. In case the adjusting device 14 is not at the same time designed also as brake, the rotary piston 24 can also act directly upon the switch device 30 or itself act as the latter, thus preventing the clutch 12 from opening automatically. In the embodiment according to the drawing, when there is sufficient axial force, the switch device 30, not rotating with the intermediate shaft 15, axially displaceably form-locks with a clutch counterpiece 32 which is connected without twist to the second output shaft 5 starting from the adjusting device 14 toward the springs 31. This occurs independently of whether the actual clutch mechanism 33 known per se, which effects an automatic form-lock only when speed or torque are uniform, is or is not precisely in gear. The clutch mechanism 33 can be composed of different free-wheel systems of a kind known per se. The direct assemblage of the clutch 12 and adjusting device 14 or shaft brake in the manner shown also has the advantage of allowing the free end 35 of the output shaft 5 to be axially guided without needing any special bearing and/or corresponding overall lengths, by means of a hollow section 34 of the intermediate shaft 15, due to the axial intermeshing of the shafts 5 and 15. But the principle of the invention is not abandoned when a correspondingly dimensioned brake is prelocated on a different site on the takeup rod of the clutch 12.

In FIG. 3 where the adjusting device 14 is not directly assembled together with one brake, it becomes possible for the clutch counterpart 12 to be kept out of gear in respect to the springs 31 by a shift fork 37 that engages it via a slide ring 36. The shift fork 37 is here held, for instance, by detents of the terminal position selected. Naturally, actuation via the auxiliary force of an adjusting motor is also conceivable.

REFERENCE NUMERALS 1. motor
2. variable gear
3. main takeoff shaft 3
4. auxiliary takeup
5. 2nd takeup shaft
6. transverse differential
7. transverse differential
8. 1st axle
9. 2nd axle
10. rear wheels
11. front wheels
12. clutch
13. service brake
14. adjusting device
15. intermediate shaft
16. wheel hub brake
17. housing
18. bearing
19. bearing
20. takeup wheel of 4
21. bar of housing
22. bar of housing
23. rotary cylinder
24. rotary piston
25. bores for fluid
26. external brake laminae
27. internal brake laminae
28. external laminae holder
29. brake body
30. switch device
31. springs
32. clutch counterpart
33. clutch mechanism
34. hollow section of 15
35. end of 5
36. slide ring
37. shift fork.

We claim:

1. An all-wheel drive for a vehicle having front and rear wheels, including a form-locking clutch (12) for drive connection of parallel transverse differentials (6, 7) which responds, in both directions of rotation, to required speed or torque differences, said clutch automatically interrupts a frictional connection between an input and an output shaft (5, 15) upon differences in speed, an adjusting device (14) being provided such that a driver can activate it for a desired length of time and lock said clutch (12), and the automatic interruption of the frictional connection can be prevented when said clutch (20) is locked so that drive to and output from said input and output shafts (5, 15) can be brought or maintained into gear independently of effective speed then existing for the front wheels (11), characterized in that said adjusting device (14) is arranged to interact with a service brake (13) and so they can be actuated together.

2. A drive according to claim 1, characterized in that said adjusting device (14) is constantly activated and said clutch (12) is locked in reverse motion of the vehicle.

3. A drive according to claim 1, wherein said adjusting device (14) comprises a shaft brake which during actuation of the brake releases or retains on a second output shaft (5 or 15) leading to a transverse differential (7), the speed or torque differences, or the clutch engages independently of the effective speeds existing at the moment on the drive wheels (11) of said vehicle that are connectable or disconnectable via said clutch (12).

4. A drive according to claim 1, wherein said clutch (12) has an axially displaceable rotary piston 24 against which an axially displaceable brake body (29) of said shaft brake can be brought to abut when said brake (13) is actuated.

5. A drive according to claim 3, wherein said adjusting device is designed as the shaft brake and only it provides braking for said front wheels (11).

6. A drive according to claim 1, wherein said adjusting device (14) or said shaft brake and said clutch (12) are situated in a common housing (17).

7. A drive according to claim 1, wherein said clutch (12) has two axially displaceable switch bodies (30, 12) that can be thrown into gear with each other by springs (31), and the one closest to said shaft brake is retained without twist on an intermediate shaft (15) coaxial with said takeup shaft (5) in the same guides in which inner friction discs of said shaft brake also rotate.

8. A drive according to claim 7, wherein said intermediate shaft (15) has a hollow section (34) adapted to accommodate the end (35) of said takeup shaft (5) that is on the side of said brake.

9. A drive according to claim 7, wherein said intermediate shaft (15) is the output shaft of an auxiliary gears (4) of a main drive shaft (3) of said vehicle and has its bearing only in said auxiliary gears (4).

* * * * *